US010787086B2

(12) United States Patent
Javaid et al.

(10) Patent No.: US 10,787,086 B2
(45) Date of Patent: Sep. 29, 2020

(54) WIRELESS CHARGING VEHICLE-TO-VEHICLE (71) Applicants: Hyundai Motor Company, Seoul (KR); KIA Motors Corporation, Seoul (KR)

(72) Inventors: Bilal Javaid, Ada, MI (US); Manavdeep Warraich, Canton, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 64 days.

(21) Appl. No.: 16/156,541

(22) Filed: Oct. 10, 2018

(65) Prior Publication Data

US 2020/0114766 A1  Apr. 16, 2020

(51) Int. Cl.
*B60L 53/12* (2019.01)
*B60B 19/00* (2006.01)
*H02J 7/02* (2016.01)
*B60B 3/10* (2006.01)

(52) U.S. Cl.
CPC ................ *B60L 53/12* (2019.02); *B60B 3/10* (2013.01); *B60B 19/00* (2013.01); *H02J 7/025* (2013.01); *B60B 2900/351* (2013.01); *B60B 2900/921* (2013.01)

(58) Field of Classification Search
CPC . B60L 53/12; B60B 19/00; B60B 3/10; B60B 2900/921; B60B 2900/351; H02J 7/025; B60Y 2410/132; B60Y 2410/115
See application file for complete search history.

(56) References Cited

U.S. PATENT DOCUMENTS

| 10,059,213 | B2* | 8/2018 | Ricci | B60C 19/00 |
| 10,076,960 | B2* | 9/2018 | Ricci | B60W 30/18127 |
| 10,581,260 | B2* | 3/2020 | Fan | H02J 50/12 |
| 2014/0042752 | A1* | 2/2014 | McDermott | H02K 7/083 290/1 R |
| 2015/0042211 | A1* | 2/2015 | Pan | H02N 2/18 310/339 |
| 2015/0266385 | A1* | 9/2015 | Lang | B60L 53/38 320/108 |
| 2016/0380469 | A1* | 12/2016 | Lethellier | H02J 7/025 320/108 |
| 2017/0008406 | A1* | 1/2017 | Takatsu | H02J 7/0042 |
| 2017/0136895 | A1* | 5/2017 | Ricci | B60L 53/126 |
| 2017/0368943 | A1* | 12/2017 | Von Novak, III | B60L 53/31 |
| 2018/0105054 | A1* | 4/2018 | Fan | H02J 50/90 |
| 2018/0205260 | A1* | 7/2018 | Maniktala | H01F 27/2895 |
| 2018/0222576 | A1* | 8/2018 | Pant | B64C 25/001 |
| 2019/0315241 | A1* | 10/2019 | Lin | B60L 50/60 |
| 2019/0315246 | A1* | 10/2019 | Li | H02J 7/025 |

FOREIGN PATENT DOCUMENTS

CN   206353716 U   7/2017

* cited by examiner

*Primary Examiner* — Nha T Nguyen
(74) *Attorney, Agent, or Firm* — Brinks Gilson & Lione (57) ABSTRACT

Disclosed herein is a vehicle component, such as a wheel, for use in a vehicle-to-vehicle charging system. The charging system may include a coil disposed about a barrel of a wheel, and in electrical connection with the battery of the vehicle. The vehicle may be an electric vehicle, and may be an autonomous vehicle. Also disclosed are the charging system, and a method charging a vehicle wirelessly by another vehicle, wherein said charging is accomplished by at least one induction coil.

10 Claims, 8 Drawing Sheets

WIRELESS CHARGING VEHICLE-TO-VEHICLE

FIELD

The present disclosure relates to devices and methods for charging an electric vehicle.

BACKGROUND

The statements in this section merely provide background information related to the present disclosure and may not constitute prior art.

Electric vehicles are being developed as an alternative to vehicles powered by petroleum based fuels such as gasoline. Electrically powered vehicles may eliminate or reduce exhaust pollutants that would have otherwise been emitted during the combustion process, and result in a reduction in vehicle noise.

Electric vehicles are generally powered by a battery, which involves periodic recharging of said battery in order to continue operation. Typically, electric vehicles are charged where the vehicle is parked, either from a wall outlet at the home of the owner, or at a dedicated charging station in a predetermined location on the road, such as at a service station.

As electric vehicles become more numerous, the demand for charging solutions has increased. In some communities, charging apparatus is being embedded directly in roads so that vehicles passing over the apparatus charge even when in operation. However, a vehicle which is completely depleted of charge is not mobile, and without a charging station, may become effectively abandoned.

SUMMARY

Further areas of applicability will become apparent from the description provided herein. It should be understood that the description and specific examples are intended for purposes of illustration only and are not intended to limit the scope of the present disclosure.

The present disclosure provides a wireless, vehicle-to-vehicle charging device and method.

The present disclosure describes a wheel for a vehicle. The wheel may include a wheel center, a cylindrical barrel disposed radially about the wheel center, the cylindrical barrel defining an inner surface and an outer surface. The wheel may include a plurality of spokes extending radially from the wheel center to the cylindrical barrel. The wheel may include a conductive element extending from a first end to a second end, the conductive element being wound about the outer surface of the cylindrical barrel to define a coil, the first end and the second end being disposed on the wheel center. The wheel may include a ferrite layer disposed over at least a portion of the inner surface of the cylindrical barrel. At least one of the plurality of spokes may include a ferrite layer. The coil may be disposed within a layer of filling material disposed about the outer surface of the cylindrical barrel.

The present disclosure describes a charging system for a vehicle. The charging system may include a wheel. The wheel may include a wheel center and a cylindrical barrel disposed radially about the wheel center. The cylindrical barrel may define an inner surface and an outer surface. The wheel may include a plurality of spokes extending radially from the wheel center to the cylindrical barrel. The wheel may include a conductive element extending from a first end to a second end, the conductive element being wound about the outer surface of the cylindrical barrel to define a coil, the first end and the second end being disposed on the wheel center. The wheel may include a ferrite layer disposed over at least a portion of the inner surface of the cylindrical barrel. The charging system may include a wireless charging module in electrical connection with the coil, the wireless charging module comprising a resonant circuit and a rectifier inverter, and a battery in electrical connection with the wireless charging module.

The present disclosure further provides a method for charging an electric vehicle. The method may include positioning a donor vehicle proximate the electric vehicle to transfer electricity, the electric vehicle including a first induction coil disposed on a wheel thereof. The donor vehicle may include a second induction coil disposed on a wheel thereof. The donor vehicle may be positioned such that the second induction coil is disposed at a distance from the first induction coil effective to transfer electrical energy. The method may include a step of analyzing a battery state of the electric vehicle. The method may include transferring electrical energy to the first induction coil from the donor vehicle.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DESCRIPTION

The following description is merely exemplary in nature and is not intended to limit the present disclosure, application, or uses. It should be understood that throughout the drawings, corresponding reference numerals indicate like or corresponding parts and features.

The present disclosure is not limited the matter disclosed below and will be understood in different forms which differ from each other. The examples provided merely make the disclosure complete and provide for fully informing the scope to those skilled in the art. In the drawings, like reference numerals refer to like elements.

Figure 1:
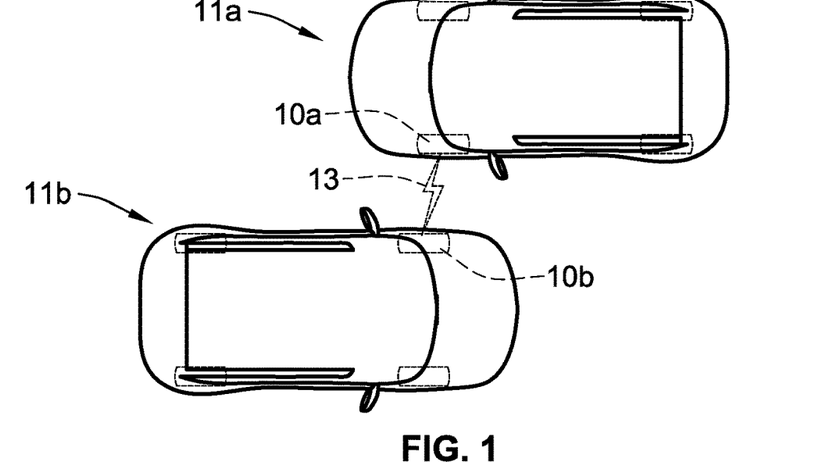
FIG. 1 is a view showing two vehicles in a charging configuration in accordance with the principles of the present disclosure.

FIG. 1 illustrates a first vehicle 11a and a second vehicle 11b in a vehicle-to-vehicle wireless charging arrangement. Each vehicle 11a/11b has a wheel 10a/10b, respectively, which is equipped with a wireless charging device constructed in accordance with the description that follows. In the illustration of FIG. 1, the wheel having said wireless charging device is the front driver-side wheel, although a vehicle in accordance with the principles of the present disclosure may have such a charging device on any wheel, or on more than one wheel. The vehicles 11a/11b are positioned such that the wheels 10a/10b are in proximity such that a charge 13 may be passed from the donor vehicle to the recipient vehicle.

Figure 2:
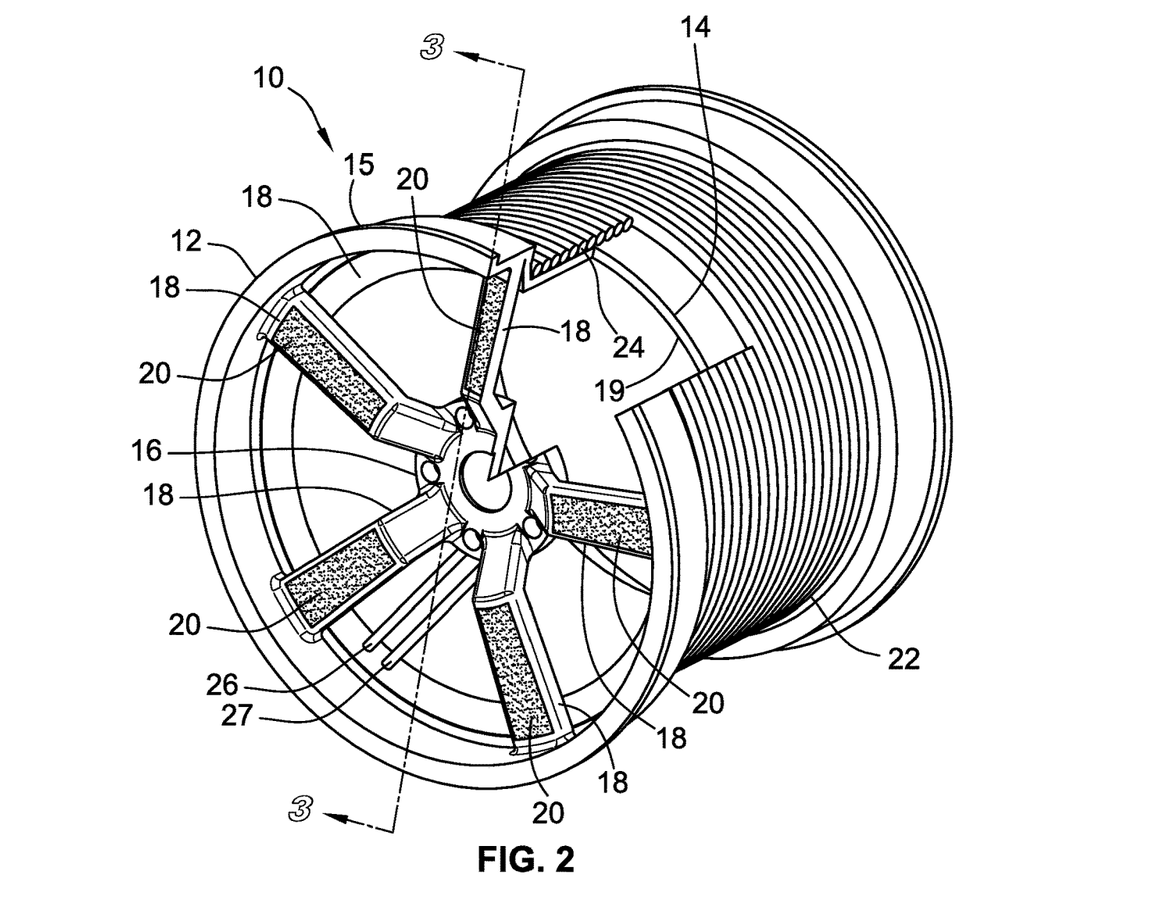
FIG. 2 is a cutaway perspective view of a wheel constructed in accordance with the principles of the present disclosure.

FIG. 2 illustrates a wheel 10 for use in a charging system. The wheel 10 has a wheel center 16, and a cylindrical barrel 12 disposed radially about the wheel center 16. Barrel 12 has an outer surface 14 and an inner surface 19. A plurality of spokes 18 extend from the wheel center 16 to the barrel 12, such as to the rim 15 of barrel 12. The wheel components, such as the barrel and the spokes, may be made of a substantially non-conductive carbon fiber material.

Conductive element 22 is wound about the barrel 12. The conductive element 22 may be a wire that is wound about the barrel 12 as a plurality of windings 24. In one aspect, the conductive element 22 may be a Litz wire, including multiple strands that are twisted, braided, or woven together. For the purposes of this description the conductive element 22 may also be referred to as a coil, though the entire length of the conductive element 22 may not be coiled. The coil can be made of a metal, including copper, or of any material suitable for the generation and transmission of electrical charge.

Figure 3:
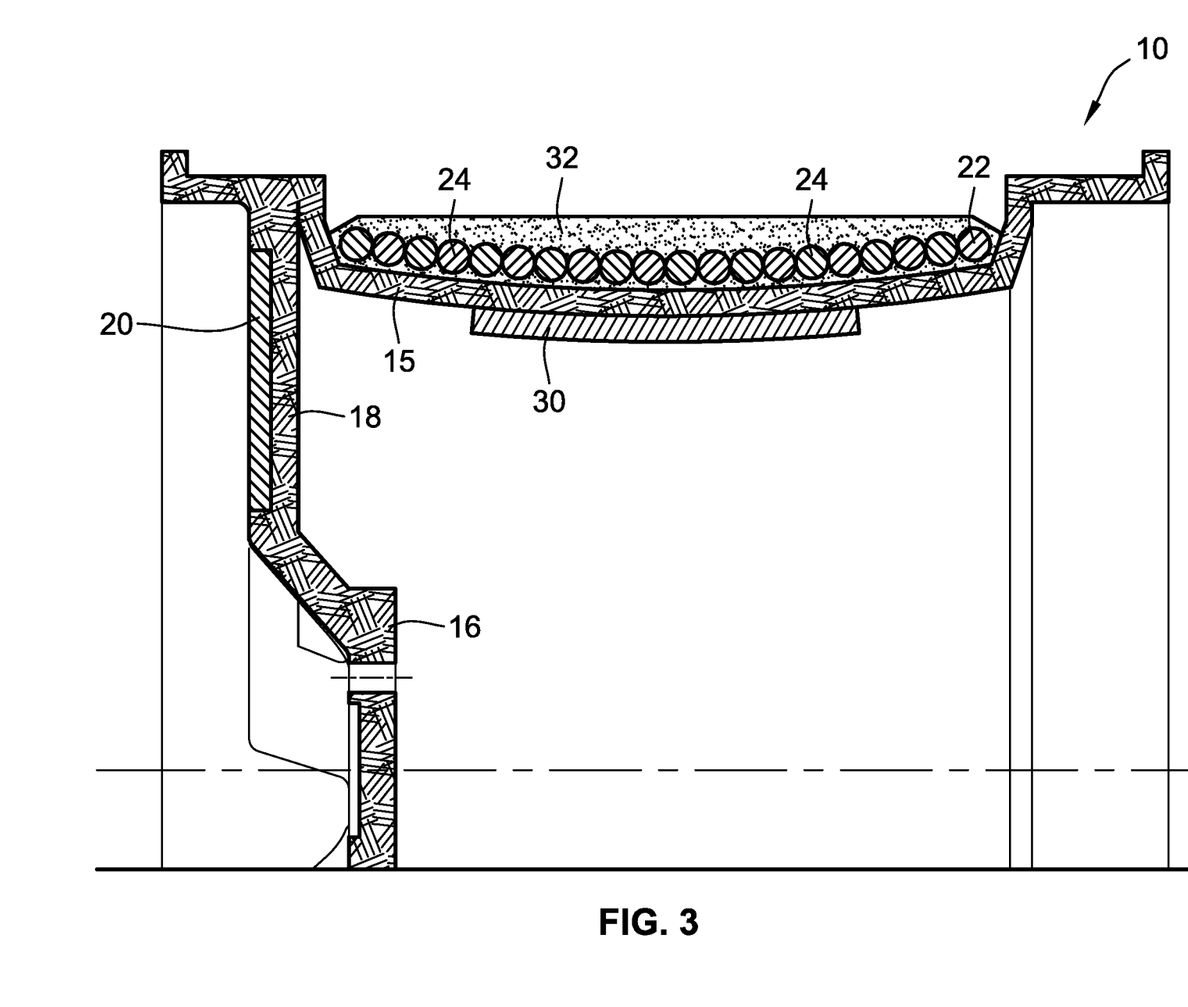
FIG. 3 is a cross sectional view of a portion of the wheel of FIG. 2 taken across line 3.

The wheel 10 according to the present disclosure may include elements made of ferrite materials thereon. For example, the wheel 10 may include a ferrite layer 30 on the inner surface 19 of barrel 12, as can be seen in FIG. 3, which enhances the coupling between windings 24 of coil 22. Optionally, some or all of spokes 18 may have a ferrite layer 20 disposed over their exterior surface.

A charging system of the present disclosure has bi-directional charging capability; that is, the charging system is capable of both transmitting a charge to a vehicle, or receiving one. In this aspect, the tire of the wheel is not affected or interfered with by the charging components, and is simply fit over the wheel as would be done on a conventional wheel.

FIG. 3 is a cross-sectional view of the wheel of FIG. 2. The windings 24 of the coil or conductive element 22 may be disposed in a layer 32 of potting material for mechanical stability. The potting material may be a substantially electrically insulating material, such as a polymer including, for example, polyurethane.

Figure 4A:
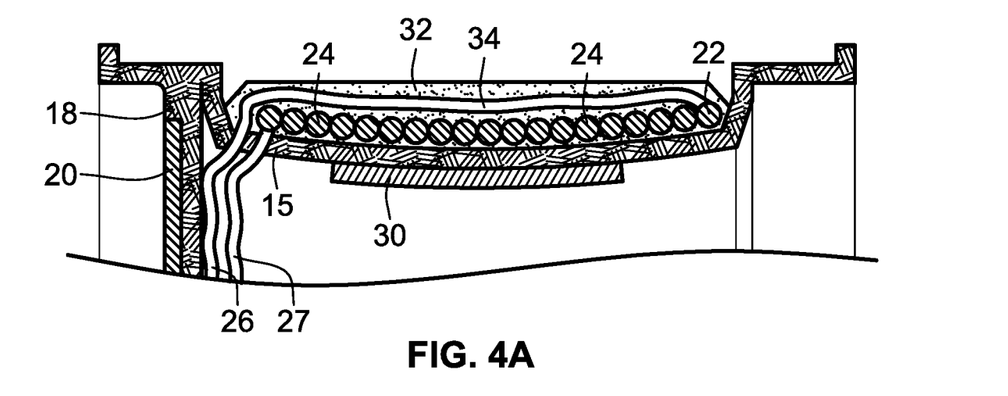
FIG. 4A is a cross sectional view of a wheel constructed in accordance with the principles of the present disclosure showing more detail.
Figure 4B:
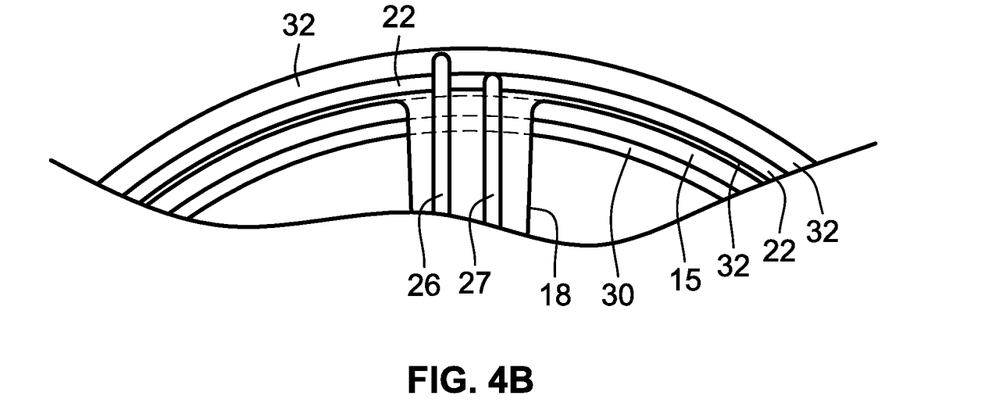
FIG. 4B is a view of the interior of a portion of a wheel constructed in accordance with the principles of the present disclosure.

FIGS. 4A and 4B illustrate the portions of conductive element 22 that are not part of the coiled portion of said conductive element. Wires at first end 26 and second end 27 of the conductive element 22 may be affixed to an inner surface of a spoke 18 and be in communication with the wheel center 16. In such an arrangement, the first end 26 and the second end 27 rotate as the wheel center 16 rotates.

Figure 5A:
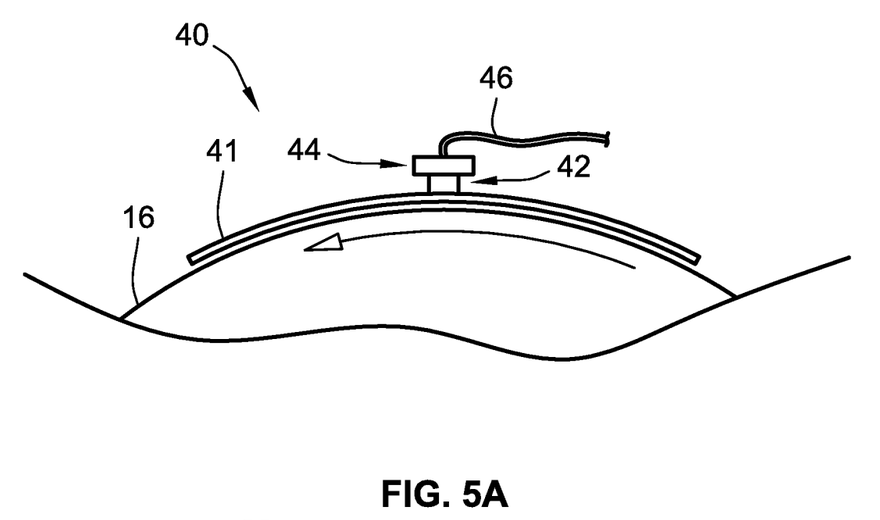
FIG. 5A is a view of an adapter for use in the wheel and system of the present disclosure.

FIG. 5A shows a rotary/stationary adapter 40 for electrically coupling the rotating portions of the wireless charging device with the battery of the vehicle. Slip cover 41 is disposed radially about the wheel center 16 in contact with the conductive brush 42, stationary coupler 44, transmission wire 46. The slip ring 41 is a conductive element, and may be configured to rotate as the wheel center 16 rotates, whereas the conductive brush 42 may be configured to remain substantially stationary as it contacts the surface of the rotating slip ring 41.

The stationary coupler and the transmission wire 46 likewise remain substantially stationary (rather than in rotary motion). The transmission wire 46 is in electrical connection with the conductive brush, and with a wireless charging module 57, as will be described below.

Figure 5B:
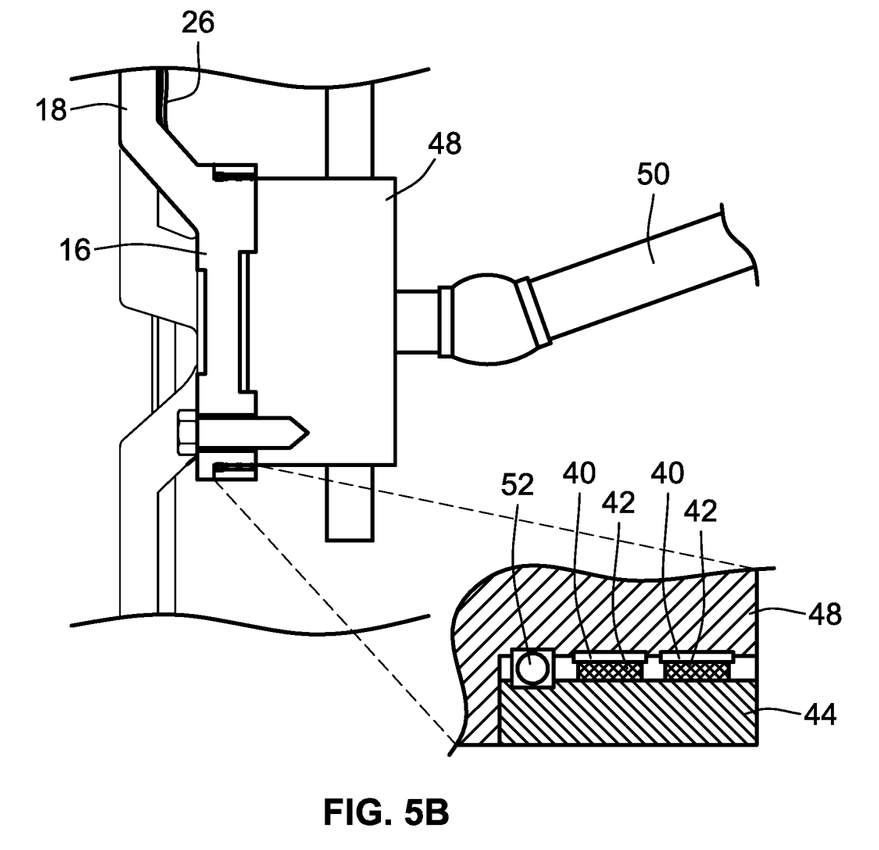
FIG. 5B is an environmental view illustrating the adapter of FIG. 5A disposed on a wheel center.

FIG. 5B shows the adapter 40 in context. The wheel center 16 is engaged with hub assembly 48, which in turn is connected to axle 50. Optionally, the adapter 40 may contact the wheel center 16 in part via ball bearing 52, which assists in stabilizing the portion of the stationary coupler 44 which does not have a conductive brush 42 as the wheel center 16 rotates. An additional stationary support (not shown) positioned proximate the wheel center 16 may be employed in order to provide a platform from which the adapter 40 may extend toward the wheel.

Figure 6:
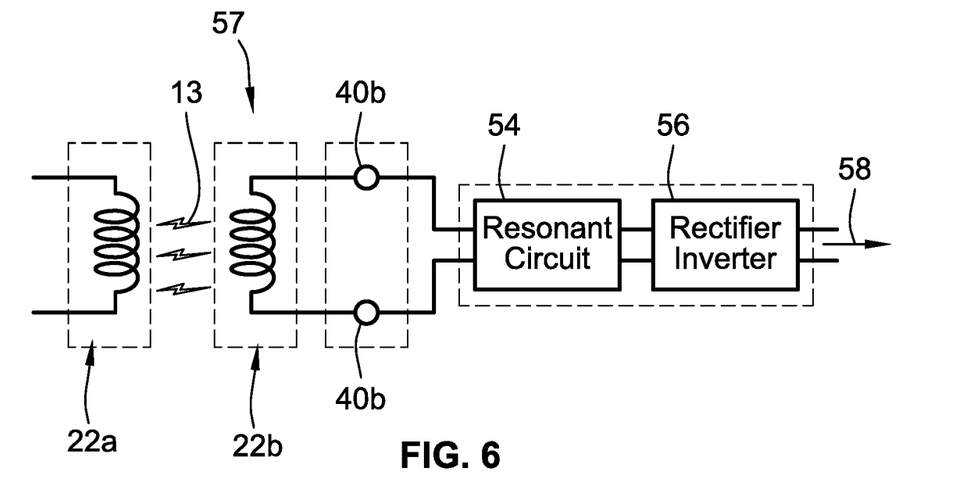
FIG. 6 is a schematic of a circuit illustrating components of a wireless charging system in accordance with the principles of the present disclosure.

FIG. 6 illustrates the main components of a wireless charging module 57 for use in conjunction with the wheel 10 and conductive element 22. The wireless charging module 57 is in operative and electrical connection with the charging components affixed to the wheel. Resonant circuit 54 lies upstream in the circuit of rectifier inverter 56 which is in connection 58 with the battery of the vehicle. The resonant circuit 54 and the rectifier inverter 56 may be disposed on or within the body of the electric vehicle. The resonant circuit 54 may, in some aspects, be a capacitor in parallel or in series with the conductive element 22. The components of the wireless charging module 57 may be arranged in different ways, as will be described in more detail below.

Figure 7:
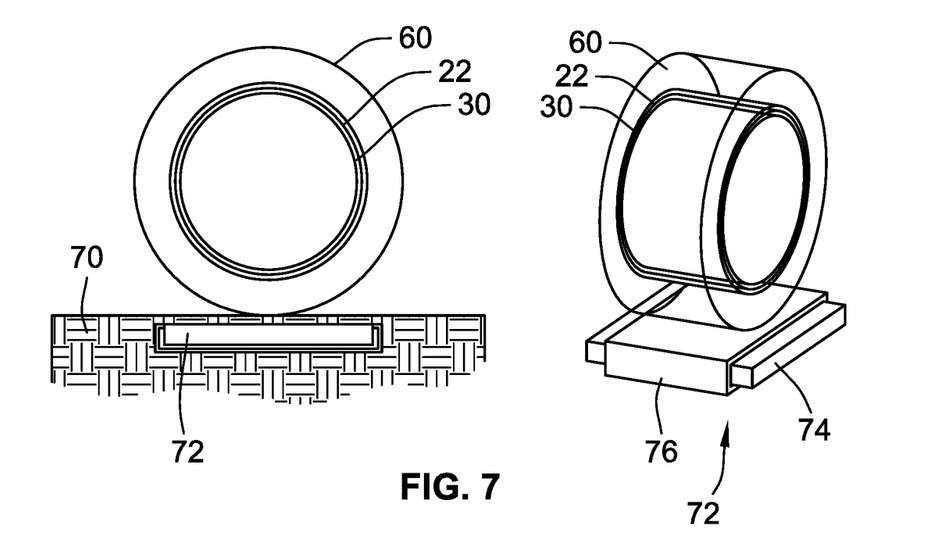
FIG. 7 illustrates views of a wheel constructed in accordance with the principles of the present disclosure positioned over a charging mat.

Although the wireless charging system as described herein is capable of charging an electric vehicle in vehicle-to-vehicle fashion, the components recited herein are also capable of using conventional induction charging apparatus to receive a charge. As shown in FIG. 7, a wheel with tire 60 mounted thereon (most detail excluded for clarity, but conductive element 22 and inner ferrite layer 30 are shown) may be positioned over a portion of the ground 70, in which charging pad 72 is embedded. The charging pad 72 may include, for example, ferrite portion 74 and coil 76, and is a conventional charging pad. Here, the charging pad 72 acts as transmitter, and the coiled conductive element 22 is a receiver. In one example, even when a tire having a size of P275/35R19 is mounted over the wheel, a coupling coefficient between the coil 76 of the charging pad 72 and the conductive element 22 is 0.16, sufficient to transmit energy from the charging pad 72 and charge the battery of the electric vehicle.

Figure 8A:
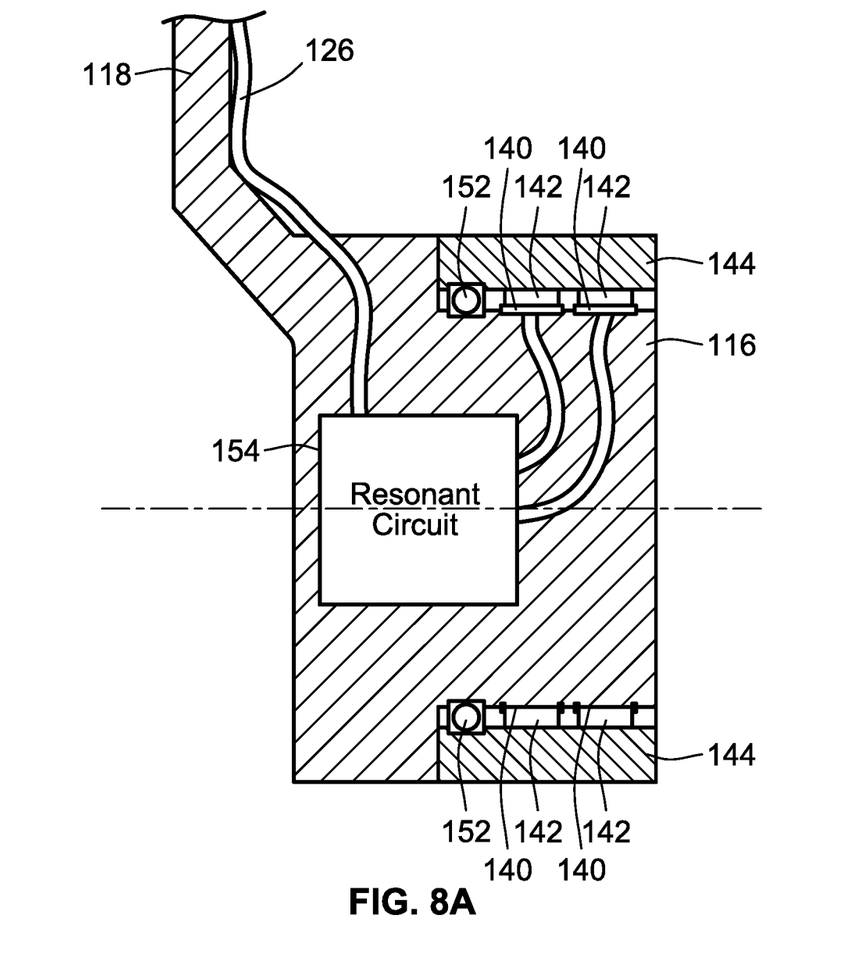
FIG. 8A is a partial cross-sectional view of another aspect of a wheel in accordance with the principles of the present disclosure.
Figure 8B:
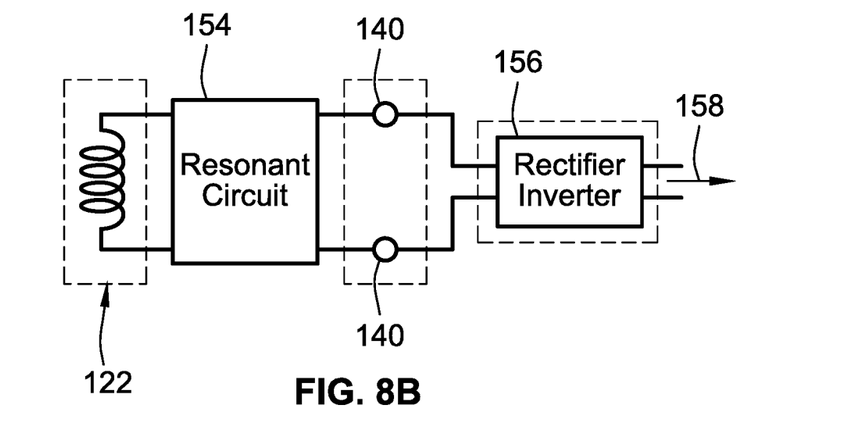
FIG. 8B is a schematic diagram of the connectivity of the device illustrated in FIG. 8A.

FIGS. 8A and 8B illustrate another arrangement of the components of a vehicle-to-vehicle charging system. As depicted in FIG. 8A, resonant circuit 154 is inside of wheel center 116, while rectifier inverter 156 is disposed on or within the body of the vehicle. Therefore, the resonant circuit 154 rotates with the wheel center 116. FIG. 8B shows the impact of the positioning of the resonant circuit on the structure of the components; the adapter 140 is located between resonant circuit 154 and rectifier inverter 156, with the rectifier inverter 156 being in connection 158 with the vehicle battery. Such a configuration may increase the mass of the wheel, but reduces the number of high voltage components housed in the vehicle body rather than the wheel.

Figure 9A:
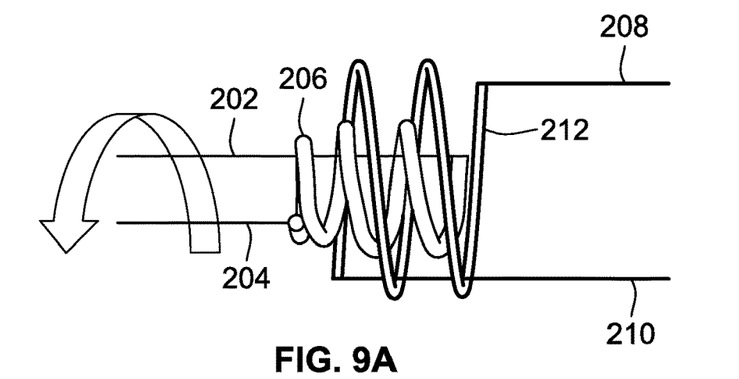
FIG. 9A is a partial side view of another aspect of a wheel in accordance with the principles of the present disclosure.
Figure 9B:
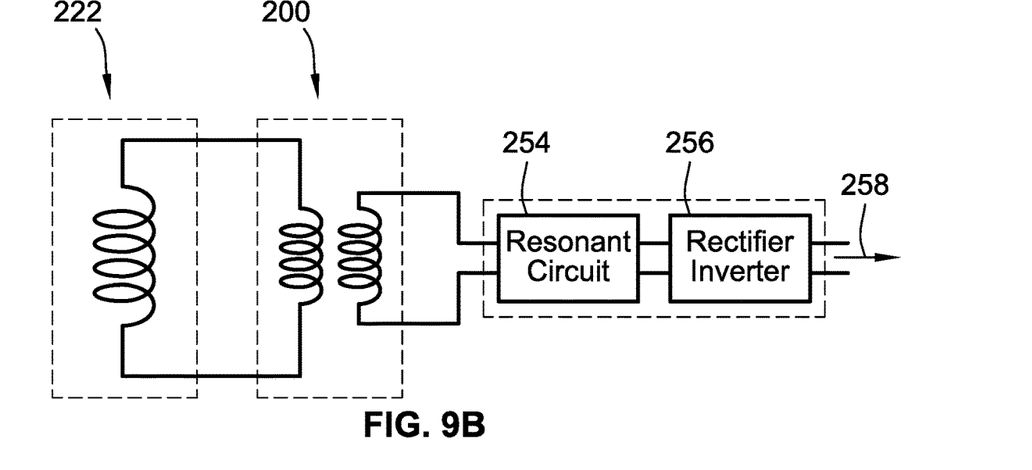
FIG. 9B is a schematic diagram of the connectivity of the device illustrated in FIG. 9A.

FIGS. 9A and 9B illustrate another aspect of a vehicle-to-vehicle charging system. In this aspect, a second, stationary conductive element or coil 212 is disposed about, and not in contact with, the primary, rotating coil 206. Stationary wires 208 and 210 are non-coiled extensions of the second conductive element 212 that extend to, and are in electrical connection with, the wireless charging module 257. Such an arrangement allows the two coils to share a magnetic field and therefore act like a transformer.

Such an arrangement may result in a charging apparatus that does not utilize a slip ring adapter, thereby reducing losses due to friction. Additionally, a device of this construction may incorporate a resonant circuit 254 into either the wheel center, or within the body of the vehicle. FIG. 9B shows the circuit 200, with the wheel coil 222 upstream of the inductively coupled coil system 200, and the wireless charging module 257 including resonant circuit 254 and rectifier inverter 256. The nested coil configuration represents a system that transmits power via an alternating current.

Figure 10:
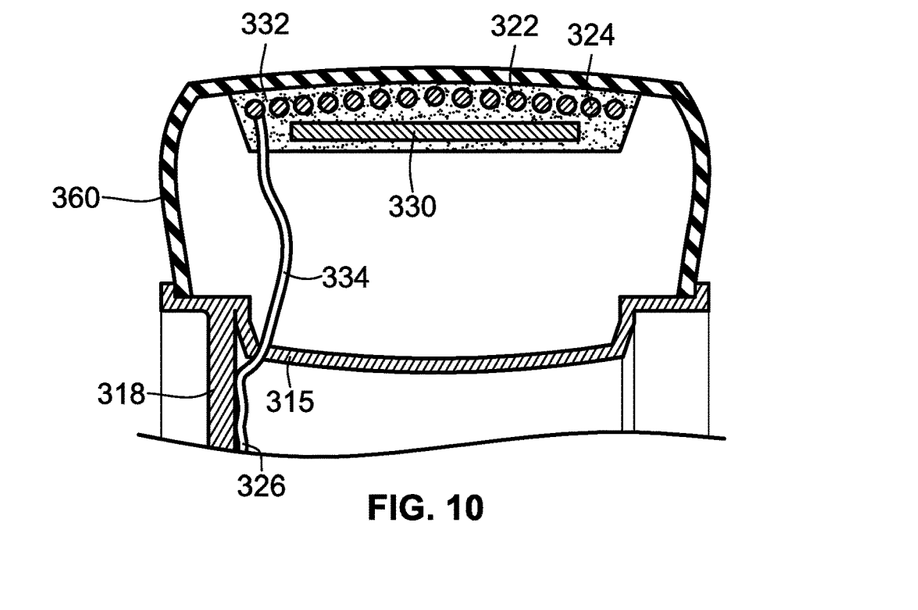
FIG. 10 is a partial cross-sectional view of a tire for use in a charging system as disclosed herein.

FIG. 10 illustrates a further form of a wireless vehicle-to-vehicle charging device. Charging components are housed within the tire 360 instead of on the barrel of the wheel. In the cross-sectional view of FIG. 10, wheel spoke 318 and rim 315 can be seen supporting a portion of tire 360. In an interior of tire 360, a layer 332 such as of potting material supports the windings 324 of coiled conductive element 322, which run along an inner surface of the tire 360, the center of the tire being a center of each winding 324. Ferrite layer 330 may also be embedded in the potting material layer 332, or may be associated with the wheel barrel as described elsewhere in this disclosure. Finally, wire 334 may extend from, or be a portion of, conductive element 322, and may be fixed along in interior of a spoke 318, as in other forms of the charging system described herein, after the tire has been mounted on the wheel.

Incorporating the conductive element or coil 322 within the tire may increase the effective diameter of the coil relative to what can be achieved by attaching to the barrel of the wheel, in some cases by about 9 centimeters to about 15 centimeters. This in turn facilitates inductive coupling to the coil of another vehicle.

Figure 11:
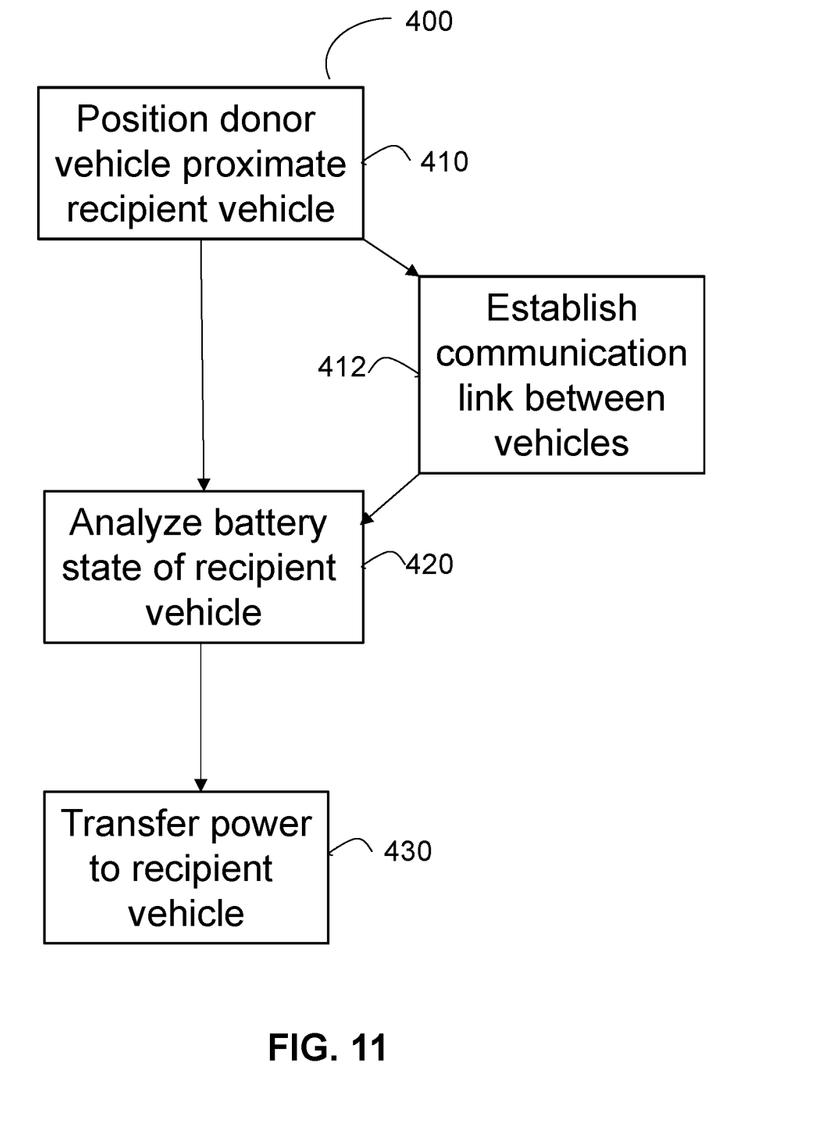
FIG. 11 is a flow chart for describing a charging process for wireless vehicle-to-vehicle charging.

FIG. 11 is a flowchart illustrating steps of a method of charging an electric vehicle according to one form of the present disclosure. This method involves a donor vehicle and a recipient vehicle, each of which is equipped with a wireless charging device, such as a wheel-based device as described herein. In a first step 410 of method 400, a donor vehicle is positioned proximate the recipient electric vehicle in such a way as to facilitate the transfer of energy to the coil of the recipient vehicle, such as wheel-to-wheel. Optionally, in step 412, the two vehicles may establish a communication link, such as by a dedicated short-range communications (DRSC) apparatus, WiFi, Bluetooth, or the like, in order to transmit information between the two vehicles. During the process, if the donor and/or recipient are participants in a charge-sharing marketplace, a financial transaction can also be initiated associated with the buying or selling of a charge.

In step 420, the state of the battery of the recipient vehicle may be analyzed. The analysis step may assist in identifying how much charge the recipient vehicle requires, whether the battery is capable of receiving a charge, and other factors. Finally, when the analysis is complete, in step 430, the donor vehicle transfers power to the recipient vehicle so that the recipient vehicle becomes operable.

In one example, the coil of the donor vehicle is inductively coupled with the coil of the recipient vehicle. The degree of coupling may be described by the use of a coupling coefficient. In one example, when both the donor wheel and the recipient wheel have a tire of size P275/35R19 mounted over them, and the wheels are aligned and are positioned 22 centimeters apart, the coupling coefficient is 0.105, which is sufficient to drive charging.

A number of variations on the above-mentioned method are envisaged. For example, the head unit of the vehicle may have an app loaded onto it that allows a user to control the vehicle-to-vehicle charging protocol, either to donate a charge or to receive one manually. The vehicle may have sufficient automation so as to call for assistance when the battery is depleted or in danger of being depleted. The donor vehicle may be an autonomous service vehicle which is configured to undertake any single step or combinations of steps as described above automatically.

Those skilled in the art will appreciate that various modifications, additions and substitutions are possible, without departing from the scope and spirit of the disclosure in the accompanying claims.

What is claimed is:

1. A wheel for a vehicle, the wheel comprising:
a wheel center;
a cylindrical barrel disposed radially about the wheel center, the cylindrical barrel defining an inner surface and an outer surface;
a plurality of spokes extending radially from the wheel center to the cylindrical barrel;
a conductive element extending from a first end to a second end, the conductive element being wound about the outer surface of the cylindrical barrel to define a coil, the first end and the second end being disposed on the wheel center; and
a ferrite layer disposed over at least a portion of the inner surface of the cylindrical barrel,
wherein the first end and the second end of the coil are configured to rotate as the wheel center rotates,
wherein the coil is electrically coupled to a battery of the vehicle by an adapter, and
wherein the adapter comprises:
a slip ring disposed radially about the wheel center, the slip ring being configured to rotate as the wheel center rotates;
a conductive brush in contact with the slip ring, the conductive brush being configured to remain substantially stationary as the slip ring rotates; and
a transmission wire in electrical connection with the conductive brush.

2. The wheel of claim 1, wherein at least one of the plurality of spokes comprises a ferrite layer.

3. The wheel of claim 1, wherein the coil is disposed within a layer of filling material disposed about the outer surface of the cylindrical barrel.

4. The wheel of claim 1, wherein a portion of the conductive element is fixed to one of the plurality of spokes.

5. The wheel of claim 1, wherein the transmission wire is in electrical connection with a wireless charging module coupled to the battery of the vehicle, the wireless charging module comprising a resonant circuit and a rectifier inverter.

6. The wheel of claim 5, wherein the wireless charging module is disposed within a body of the vehicle.

7. The wheel of claim 5, wherein the resonant circuit is disposed in the wheel center.

8. The wheel of claim 7, wherein the rectifier inverter is disposed in the wheel center.

9. The wheel of claim 1, wherein the conductive brush is fixed to a stationary adapter proximate the wheel center.

10. A wheel for a vehicle, the wheel comprising:
- a wheel center;
- a cylindrical barrel disposed radially about the wheel center, the cylindrical barrel defining an inner surface and an outer surface;
- a plurality of spokes extending radially from the wheel center to the cylindrical barrel;
- a conductive element extending from a first end to a second end, the conductive element being wound about the outer surface of the cylindrical barrel to define a coil, the first end and the second end being disposed on the wheel center;
- a ferrite layer disposed over at least a portion of the inner surface of the cylindrical barrel; and
- a stationary coil disposed about the conductive element, the stationary coil being in electrical connection with a wireless charging module coupled to the battery of the vehicle, the wireless charging module comprising a resonant circuit and a rectifier inverter, wherein the first end and the second end of the coil are configured to rotate as the wheel center rotates.

* * * * *